July 15, 1941.  A. BOYNTON  2,248,951

DIFFERENTIAL STAGE LIFT FLOW DEVICE

Filed Dec. 8, 1939

ALEXANDER BOYNTON, INVENTOR,

BY Jesse R. Stone
Leslie D. Clark
ATTORNEYS.

Patented July 15, 1941

2,248,951

UNITED STATES PATENT OFFICE 2,248,951

DIFFERENTIAL STAGE LIFT FLOW DEVICE

Alexander Boynton, San Antonio, Tex.

Application December 8, 1939, Serial No. 308,310

5 Claims. (Cl. 137—111)

My invention relates to flowing devices for wells and broadly includes the subject matter of my copending application, Serial Number 308,308, filed December 8, 1939.

The principal object is to start wells at relatively low pressures and to flow them at low pressures with resulting low gas-oil ratios.

In accomplishing this purpose, other objects are: 1, to actuate the valve controlling the admission of pressure fluid by a secondary power take-off developing unusually great force in controlling the valve seating and other valve movements; 2, to minimize friction by employing a free pressure responsive element to actuate the valve; and 3, to meter the pressure fluid to the load in proportion to the energy required most economically to perform the work to be done.

Either the tubing or the casing may be employed as the eduction or induction conduit, by slightly changing the construction of the devices employed for flowing through one to accomplish flow through the other.

A metallic bellows is placed in a chamber interposed between the well liquid within an eduction tube and the pressure fluid in an induction tube. The bellows is secured at one end and has attached to its free end a valve adapted to regulate and finally cut off the flow of pressure fluid into the well liquid in the eduction tube. The exterior of the bellows is exposed to the pressure fluid and the interior of the bellows is exposed to the well fluid. The well liquid, a spring interior of the bellows, and the expansive force of the bellows, exert the valve unseating forces, and the pressure fluid exerts the valve seating force. Each of these forces is constant, except that of the well liquid, which varies according to location in the eduction tube. The devices are spaced at intervals in the tubing and each device is constructed to admit into the eduction tube the proper volume of pressure fluid to accomplish flow from its level by the most efficient expenditure of pressure fluid energy.

I attain the foregoing objects by mechanism illustrated in the accompanying drawing in which—

Similar characters of reference are employed to designate similar parts throughout the several views.

The differential will be understood to be the difference in pressures obtaining within and exterior of the tubing at any level.

The column of well liquid which stands up in the eduction conduit, responsive to pressure fluid force, will be referred to as the upstanding column.

Figure 2:
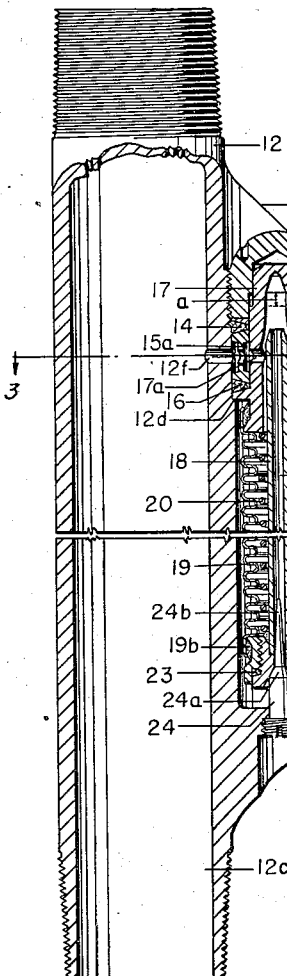
Fig. 2 is a longitudinal section through the preferred embodiment of the invention for tubing flow.

In Fig. 2, the nipple-like body 12, which may be cast or otherwise fabricated integrally with the shell or valve housing 12a, has a circular opening 12c' in line with and of approximately the same size as the opening through the tubing, the sloping ends 12b and 12b' of the shell being for the obvious purpose of guiding the device in passing obstructions frequently encountered in well casing when the device is moved longitudinally in the casing.

The bellows 19, which for example, may have a diameter of one to one and one-half inches, is mounted in the valve housing 12a. Said bellows is secured upon its upper connection 17 by the solder or weld 19a and is secured upon its lower end connection 21 by the solder or weld 19b. The lower end of the bellows is closed hermetically by the packing 23, and the bushing member 22, having threaded engagement within the member 21. The bellows may have a clearance, such as $\frac{1}{32}$ to $\frac{1}{16}$ inch within the wall of the bore 12c. The valve tube 18 may have its lower end pressed into the upper end of the bushing 22 and further secured by the weld 18d. This tube has the slight annular space 18c between it and the central opening within the member 17 which is mounted in the upper end of the valve chamber. The coiled spring 20, having slight clearance over the tube 18 and relatively large clearance within the bellows, is installed under some compression between its end supports 17 and 22, and serves to hold the bellows member resiliently extended.

The bellows 19 is secured within the bore 12c by the engagement of an annular flanged portion of the member 17 upon the slight internal annular should 12d. This engagement is secured by the packing 16, urged downward by the force of the plug 13, having threaded engagement within the upper end of the shell 12a and transmitting its force through the gland ring 14a, the packing 14, and the sleeve 15. The upper end of the shell or housing 12a thus is closed hermetically and a leak-proof barrier provided between the annual chambers 12g and 15c. The sleeve 15, slidable over the member 17, has a portion turned off from the outside forming the annular chamber 15c and another portion turned off from the inside forming another annual chamber 15a. The enlarged circular flanged portion of the member 17 is closely received within the bore in the upper portion of the shell 12a above the shoulder 12d, and the upper end of the member 17 has slight clearance within the central opening in the plug 13.

The check valve base 24, having the upstanding round pin 24b, has threaded engagement within the lower sloping end 12b' of the shell 12a. The seat 24a is adapted normally to engage with the valve 22a, formed centrally within the lower end of the bushing 22. The length of the pin 24b, preferably, should be somewhat greater than the distance between the valve 18a and the seat 17b, so that the pin will remain within the member 22 when the valve seats. The diameter of the upper end of this pin may be such as $\frac{1}{16}$ inch, while the base of this pin may have a diameter of $\frac{1}{4}$ to $\frac{3}{8}$ inch. The diameter of the central opening 18b in the tubular stem may be two to five thousandths inch greater than the diameter of the pin 24a at its base.

There is a passage from the interior of the member 17 to the interior conduit 12c' of the eduction tube by way of opening 17a in member 17, 15b in the sleeve 15 and the opening 12f in the tube 12.

The openings 12f and 15b each may have a diameter of $\frac{3}{8}$ to $\frac{1}{2}$ inch, while the lateral openings 17a may be somewhat smaller.

The side of the pin 24b may be tapered, straight, convexed, or concaved, according to the volume of pressure fluid admitted to flow the well at different differentials.

The central circular opening within the upper portion of the member 17 may be arcuately tapered between the lateral openings 17a and the untapered portion a. The diameter of the tapered opening at the lateral openings 17a may be such as $\frac{1}{32}$ to $\frac{1}{8}$ inch greater than the outside diameter of the tube 18, which tube preferably is untapered except for the valve 18a.

The taper of the pin 24b tends to increase the flow of pressure fluid through the device as the differential increases and the valve 18a approaches its seat 17b; while at the same time the tapered opening between the straight portion a of the valve chamber and the openings 17a tends to decrease the flow of pressure fluid through the device. The result of this contracting relation between this pin and the tapered chamber tends to admit the greatest volume of pressure fluid through the device at the differential obtaining when the valve 18a is approximately midway of its travel toward the seat 17b. If a greater volume of pressure fluid is desired to pass through the device at low differentials, the pin 24b may be made of smaller diameter, or entirely eliminated.

The untapered portion a of the valve chamber receives the tube 18 with a close slide valve fit. The valve is, therefore, a combination of slide and poppet elements. Momentary high pressures in the flow tubing thus are prevented from opening the valve 18a when it is seated.

The engagement of the bushing member 22 upon the seat 24a serves the double purpose of spacing the valve 18a at proper distance from its seat 17b, and of forming a check valve to prevent the well fluid from draining back through the devices at conclusion of the flowing operation, it being assumed that a check valve is employed in the tubing between the lowest device and the nipple 6.

Figure 4:
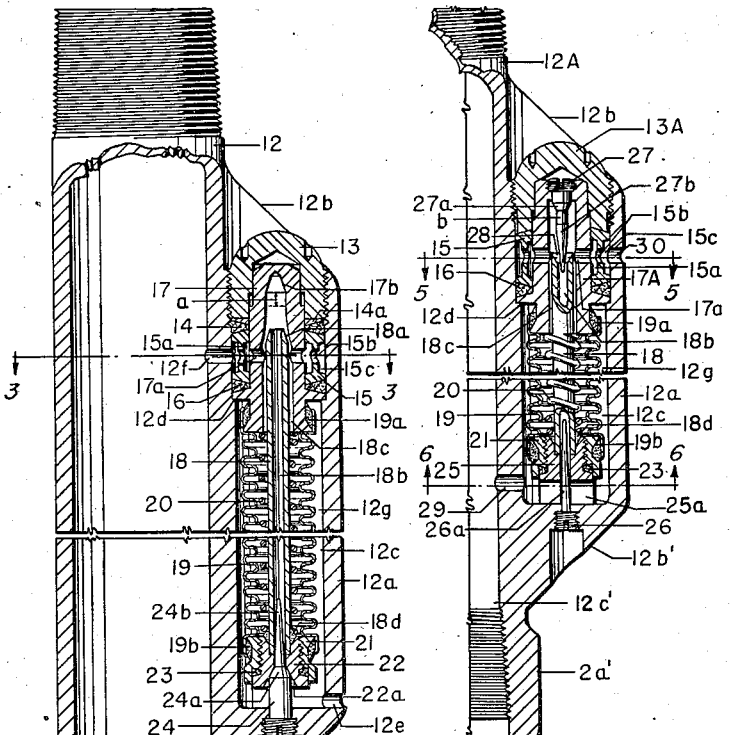
Fig. 4 shows a modified form of the device in Fig. 2 adapted for casing flow.
Figure 5:
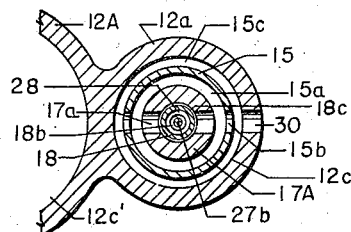
Fig. 5 is a cross section on the line 5—5, of Fig. 4.
Figure 6:
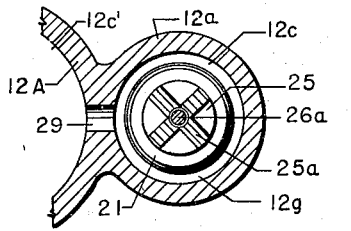
Fig. 6 is a cross section on the line 6—6, of Fig. 4.
Figure 3:
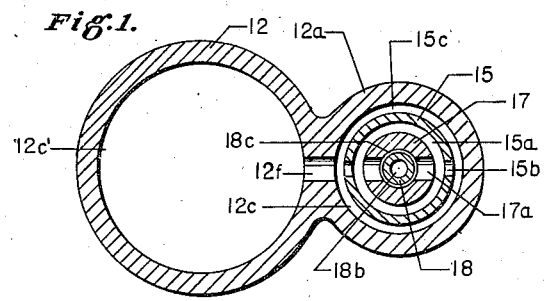
Fig. 3 is a cross section on the line 3—3, Fig. 2.

The valves 18a, Fig. 2, and 28, Fig. 4, are normally open until closed by the differential, as appears in said figures.

The path of the pressure fluid through the device shown in Fig. 2 is as follows: out of the annular space 1a, Fig. 1, via the lateral intake opening 12e and the annular chamber 12g, surrounding the bellows, where it unseats the valve 22a and continues consecutively through the opening 18b, the openings 17a, the inner annular chamber 15a, the openings 15b, the outer annular chamber 15c, and into the tubing passage 12c', via the opening 12f.

The outside of the bellows is exposed to the pressure fluid which enters the annular chamber 12g, surrounding the bellows, via the intake port 12e. This fluid exerts the sole compression force upon the bellows and spring 20 which seats the valve 18a upon its seat 17b at a pre-determined differential.

The inside of the bellows is exposed to the pressure of the upstanding column of well fluid. The pressure of this fluid, and the force required to compress the bellows and spring, are the only forces which urge the valve 18a away from its seat.

The path of the valve unseating force against the inside of the bellows is out of the tubing via the opening 12f, the annular space 15c, the openings 15b, the annular chamber 15a, the openings 17a, and the annular clearance 18c.

The valve seating force remains constant with the value of the pressure fluid, while the valve unseating force varies according to the location of the valve with relation to the upstanding column. The higher the valve is above the base of the upstanding column, the less this unseating force will be, resulting in increased differentials with increased distance from the base of the upstanding column. This increasing differential closes the higher valves, while the decreasing differential, nearer the base of upstanding column, causes the valves to be open there.

At the base of this column, these opposing forces are equal and the pressure fluid control valve in a device there will be wide open, as in Figs. 2 and 4. If, on the other hand, a device is positioned in the tubing at such distance above the base of the upstanding column that the portion of fluid in that column between its base and the device exerts exactly as much force per square inch as the force required to close the valve, then that valve will be just closed. Higher devices will have their valves closed by increasing force with increasing height of their positions in the upstanding column, or above it. Each device between the one barely closed and the base of the upstanding column will have its valve increasingly farther away from its seat as its position approaches the base of the upstanding column.

The devices may be spaced 150 to 300 feet apart in the tubing.

The force per square inch required to compress the bellows and spring far enough to seat the valve 18a should be somewhat greater than the force per square inch exerted by the well liquid between adjacent devices in order that an upper device will not close before the one next under it is uncovered and begins intaking pressure fluid.

The value of the pressure fluid employed to flow the well preferably should be at least some two or three times the force required to seat the valve 18a and, of course, may be much greater. Manifestly, increasing the value of this fluid will increase the rate of liquid expulsion from the well.

The depth from which the well is to be flowed, the spacing of the devices, the size of the eduction tube, the volume of the flow, and the physical properties of the well liquid, are all factors to be considered in determining the volume of pressure fluid to be admitted through the devices and the value of the pressure fluid to be employed, as those skilled in the art will understand.

Figure 1:
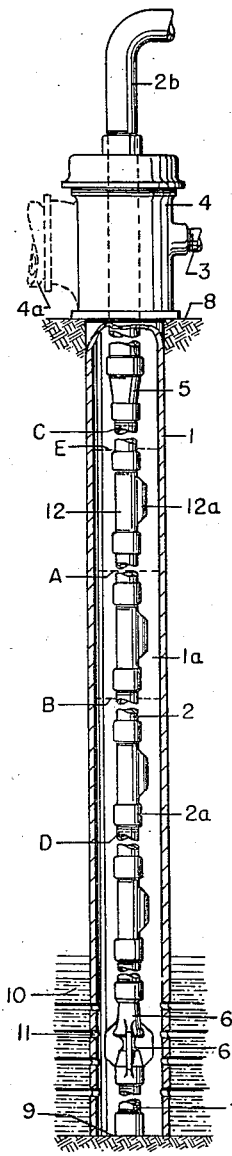
Fig. 1 is an installation plan of the devices in a well, the well casing being shown in longitudinal section.

In Fig. 1, the casing 1 and the tubing 2 have a hermetic seal formed between them by the casing head 4, proximately above the ground surface 8. The tubing may be smaller in the lower regions of the well than above, the different sizes being shown connected by the swaged nipple 5.

The devices 12, spaced at intervals in the tubing by means of the couplings 2a, are central of the casing within which is the annular space 1a.

The anchor string 7 may extend to the bottom of the well bore 9, the intake or discharge nipple 6, having lateral openings 6a, forming the connection between the tubing and the anchor string.

The gun perforations 11 admit the contents of the producing formation 10 into the well.

The pipe line 3 connected into the casing head may be employed to convey pressure fluid into the annular space 1a if the well does not produce enough gas to flow it or this line may be employed to convey surplus gas away from the well.

For flowing the well through the tubing, the pipe line 4a connected into the casing head for casing flow, will be considered as disconnected from the casing head and replaced by a plug.

An unshown valve in the line 3 is assumed to be closed against pressure fluid in that line of sufficient value to flow the well.

Expulsion of well liquid results from the expansion of pressure fluid entering the upstanding column of well liquid in a manner well known to the art.

The liquid level in both the tubing and the annular space 1a is assumed to be at A, Fig. 1.

Now, to flow the well through the tubing, open the unshown valve in the line 3, which will quickly discharge pressure fluid into annular space 1a and cause the valves in all devices above the well liquid to close. The liquid level in the annular space 1a will become depressed to B and the liquid level in the tubing will rise to C. The device next to the base of this upstanding column will be open, this being the second device from the top. The next upper device will remain closed or just opening, depending upon whether or not the unseating force of the bellows and spring, plus the weight of the upstanding column above the upper device, is greater or less than the seating force of the pressure fluid.

It is apparent that the flowing operation originates at the device next above the base of the upstanding liquid column and follows that column downward in stages, one device after another, as the lower devices are successively uncovered. It is also apparent that the value of the pressure fluid employed with these devices may be only a fraction of the pressure which would be required to expel the well liquid if it were forced out by pressure fluid which could enter only through the lower end of the tubing.

If the rate of flow from the well be greater than the rate of production from the formation 10, the liquid level in the annular space 1a will become depressed later to the lateral openings in the nipple 6, when the upstanding contents of the tubing will be expelled as a slug; after which the pressure fluid and well liquid will co-mingle through the nipple 6, until the valve in the flow line 2b is closed or until the pressure fluid supply through the pipe line 3 is cut off, if the well is flowed by pressure fluid from that source. If the well produces its own pressure fluid, flow through the tubing, of course, will be interrupted by opening the unshown valve in the line 3.

Manifestly, the flowing operation may be repeated as often as the well will produce the necessary liquid to provide the upstanding column.

The check valve 22a will engage its seat 24a to prevent the tubing from being drained through the devices at conclusion of each flowing operation. Unless it is desirable to reverse the pressure occasionally for well-cleaning purposes, a check valve may be also employed in the tubing proximately above the nipple 6, in order to trap all such drainage in the tubing.

The device illustrated in Fig. 4 has a body portion 12A, somewhat different from the corresponding body 12 in Fig. 2, the lower end of the body 12A being formed into a half coupling 2a' replacing the coupling 2a upon the lower end of the tubing flow devices. The intake port 29, corresponding to the opening 12e in Fig. 2, is moved to the inside between the bore 12c and the tubing passage 12c'. The discharge port 30 in Fig. 4 corresponds in purpose to the discharge opening 12f in Fig. 2, but is moved to the outside to discharge pressure fluid out of the tubing 2 into the annular space 1a. The plug 13A is slightly differently formed from the plug 13 in Fig. 2, because the packing 14 employed in the latter figure is omitted from Fig. 4.

The bellows upper end connection 17A is engaged upon the shoulder 12d and has the pin base 27 engaged through its upper end. The valve seat 27a is adapted to be engaged by the valve 28 formed upon the upper end of the tube 18. The round arcuately tapered pin 27b, having an untapered portion b, depends centrally below the seat 27a.

The bushing member 25, threadedly engaged within the member 21, has a central longitudinal opening which may be of the same diameter as the opening 18b, through the tubular valve stem and has wings 25a, normally landing upon the bottom of the bore 12c. The pin base 26 has leak-proof threaded connection within the lower sloping end 12b' and has the upstanding round tapered pin positioned centrally of the lower end of the central opening through the tube 18.

The pin 27b is smallest at its lower end where it may have a diameter such as $\tfrac{1}{16}$ inch. The straight portion b at the upper end of this pin may have a diameter such as $\tfrac{1}{4}$ to $\tfrac{3}{8}$ inch. The pin 26a may have similar dimensions. The length of both pins should be such that their ends will remain within the central opening 18b of the tube 18 in all positions thereof, as is apparent in Fig. 4.

The purpose of the upper pin 27b is to decrease the bypassing space between it and the tube 18 as the valve 28 approaches its seat 27a. The purpose of the lower pin 26a is to increase the bypassing space between it and the central opening through the member 25 as the valve 28 approaches its seat.

The straight section b of the pin 27b has a close slide valve fit within the opening 18b. This straight section prevents the valve 28 from being forced open by high velocity slugs passing the device during the flowing operation.

If a large flow of pressure fluid through the device is desired at low differentials, the lower pin 26a may be made smaller or entirely omitted.

While flowing through the casing, the path of pressure fluid through the device illustrated in Fig. 4 is as follows: out of the tubing space 12c', into the intake port 29, thence via the openings between the wings 25a, the central opening through the bushing member 25, the opening 18b, the annular clearance between the members 18 and 17A, the lateral openings 17a, the annular space 15a, the openings 15b, the annular space 15c, and out into the annular space 1a, Fig. 1, through the discharge port 30.

The valve seating force, which is exercised by the pressure fluid, enters the annular chamber 12g and surrounds the bellows via the port 29.

The pressure of the well liquid interior of the bellows, along with the force required to compress the bellows and spring, is the valve unseating force. This force enters the bellows from the annular space 1a, Fig. 1, via the discharge port 30, the annular space 15c, the openings 15b, the annular space 15a, and the slight annular clearance 18c, between the member 17A and the tube 18.

The devices may be constructed and adjusted so that the valve 28 will seal off upon the seat 27a at the same force required to seat the valve 18a upon the seat 17b in Fig. 2. Likewise, the spacing of the devices in the induction conduit 2 may be similar to that stated for the tubing flow.

Fig. 1 will be employed to explain the casing flow also. The tubing 2 (now the induction tube), preferably, will be smaller than that employed for tubing flow and may be all of one size.

Before beginning the flowing operation, through the casing, it will be assumed that the pipe line 3 in Fig. 1 is removed from the casing head and replaced by a plug. The flow line 4a is assumed to be open. The pipe line 2b is connected with pressure fluid of proper value. The well liquid is assumed to be standing in both the casing and the tubing at the common level indicated at A.

Now, to flow the well through the casing, turn the pressure fluid into the tube 2 via the induction line 2b. All valves in the devices will close at the predetermined differential. The liquid in the tubing will quickly lower to the level indicated at D, while the liquid in the annular space 1a will rise, at the same time, to the level indicated at E.

The valve in the device next above the level D will open while the valve in the device next above it will be still closed or slightly open, depending upon the differential at that level.

The action of the devices in discharging pressure fluid into the upstanding column in the annular space 1a to cause a well to flow through the casing is so similar to their action in flowing through the tubing as to be understood without further explanation.

In both forms of the invention, it will be observed that the diameter of the bellows is shown to be many times greater than the diameter of the valves. It is apparent that this relation will cause the pressure fluid control valves to seat with much greater force than if the pressure fluid acted directly upon the valves.

The valves controlling the admission of pressure fluid into the upstanding column of well liquid may be adjusted to close all at one differential, or they may be adjusted to close at progressively different differentials. The volume of pressure fluid admitted through these devices may be also progressively varied as well as their spacing. Proper adjustment of the devices, their spacing in the well, and the value of the pressure fluid to be employed may be varied according to various well conditions, as those skilled in the art will know.

The invention as herein illustrated and described is manifestly subject to many changes in construction and arrangement of parts which will remain within the scope and purpose of the stated objects and appended claims.

What is claimed is:

1. In a stage lift flow device for wells, a valve body including a tubular housing having an opening at one end communicating with the exterior of the valve body and an opening at the other end communicating with the interior of the valve body, an end connecting member set in one end of said housing, said member having a longitudinal recess, a bellows diaphragm having a sealing connection with said member whereby said diaphragm is supported, a tubular bushing closing the free end of said bellows diaphragm except for an axial passage, a tubular valve stem fixed in said passage and projecting into said connecting member, a valve on one end of said stem, a seat for said valve in said member, said connecting member having a lateral opening leading to one of the openings in said housing, and means at the lower end of said member to meter the flow of fluid through said housing and said tubular valve stem.

2. In a stage lift flow device for wells, a valve body including a tubular housing having an opening at one end communicating with the exterior of the valve body and an opening at the other end communicating with the interior of the valve body, an end connecting member set in one end of said housing, said member having a longitudinal recess, a bellows diaphragm having a sealing connection with said member whereby said diaphragm is supported, a tubular bushing closing the free end of said bellows diaphragm except for an axial passage, a tubular valve stem fixed in said passage and projecting into said connecting member, a valve on one end of said stem, a seat for said valve in said member, said connecting member having a lateral opening leading to one of the openings in said housing, and a restricted passage from said one of the openings in the housing around said valve stem to the interior of said diaphragm, the other opening in said housing leading to the interior of the housing outside said diaphragm.

3. A valve body, a tubular housing on one side thereof, said housing having an opening at one end to the interior of said body and an opening at the other end thereof to the outside of said body, a bellows diaphragm fitting loosely in said housing, a bellows connection anchored in the one end of said housing, said connection having an axial recess tapered to provide a valve seat and a lateral opening communicating with one of the openings in said housing, a sealing connection between said diaphragm and the inner end of said connection, a bushing connected with the free end of said diaphragm, said bushing having an axial passage, a tubular valve stem in said passage and projecting through said diaphragm into the recess in said connection adjacent said seat, and a valve on the end of said stem and coacting with said seat to gradually limit the flow of fluid through said valve stem as said valve approaches said seat.

4. A valve body, a housing thereon having an opening at the upper end thereof connected with the interior of the body and an opening at the lower end communicating with the exterior of the body, a bellows diaphragm in said housing, an anchoring connection at the upper end of said diaphragm, a bushing at the lower end of said diaphragm having an axial passage, a tubular valve stem anchored in said bushing and extending upwardly in said diaphragm, a valve on said stem, a seat therefor in said connection, a fluid passage from the interior of said diaphragm to said upper opening, the outer surface of said diaphragm being exposed to fluid pressure through said lower opening, and means at the lower end of said housing to close the passage of fluid through said valve stem when said valve is open to its greatest extent.

5. A valve body, a housing thereon having an opening at the upper end thereof connected with the interior of the body and an opening at the lower end communicating with the exterior of the body, a bellows diaphragm in said housing, an anchoring connection at the upper end of said diaphragm, a bushing at the lower end of said diaphragm having an axial passage, a tubular valve stem anchored in said bushing and extending upwardly in said diaphragm, a valve on said stem, a seat therefor in said connection, a fluid passage from the interior of said diaphragm to said upper opening, the outer surface of said diaphragm being exposed to fluid pressure through said lower opening, and means at each end of said tubular stem to meter the fluid passing through said stem during the movement of said valve in response to fluid pressure upon said diaphragm.

ALEXANDER BOYNTON.